United States Patent
Englert et al.

(10) Patent No.: US 10,222,145 B2
(45) Date of Patent: Mar. 5, 2019

(54) SOLDERABLE FLUID CHANNEL FOR A HEAT EXCHANGER OF ALUMINUM

(75) Inventors: Peter Englert, Bad Friedrichshall (DE); Bernd Grünenwald, Nürtingen (DE); Volker Kurz, Stuttgart (DE)

(73) Assignee: MAHLE INTERNATIONAL GMBH, Stuttgart (DE)

(*) Notice: Subject to any disclaimer, the term of this patent is extended or adjusted under 35 U.S.C. 154(b) by 174 days.

(21) Appl. No.: 13/809,983

(22) PCT Filed: Jul. 12, 2011

(86) PCT No.: PCT/EP2011/061839
§ 371 (c)(1),
(2), (4) Date: Mar. 28, 2013

(87) PCT Pub. No.: WO2012/007452
PCT Pub. Date: Jan. 19, 2012

(65) Prior Publication Data
US 2013/0180694 A1    Jul. 18, 2013

(30) Foreign Application Priority Data

Jul. 16, 2010 (DE) .................. 10 2010 031 468

(51) Int. Cl.
*F28F 1/00* (2006.01)
*F28F 1/20* (2006.01)
(Continued)

(52) U.S. Cl.
CPC .............. *F28F 21/08* (2013.01); *B21C 37/14* (2013.01); *B21C 37/151* (2013.01);
(Continued)

(58) Field of Classification Search
CPC ...... F28F 21/08; F28F 21/084; F28F 2275/06; B23K 1/0012; B23K 2201/14; B23K 35/286; C22C 21/00
(Continued)

(56) References Cited

U.S. PATENT DOCUMENTS 3,252,510 A * 5/1966 Blankenhorn ................ 165/166
4,172,548 A   10/1979 Nakamura
(Continued)

FOREIGN PATENT DOCUMENTS

CN    1049809 A    3/1991
CN    1176376 A    3/1998
(Continued)

OTHER PUBLICATIONS

Hiromi Nagaumi et al., Mechanical Properties of High Strength Al—Mg—Si Alloy during Solidification, 2006, Materials Transactions, vol. 47 No. 12, pp. 2918 to 2924.*
(Continued)

*Primary Examiner* — Jason Thompson
(74) *Attorney, Agent, or Firm* — Paul D. Strain, Esq.; Strain & Strain PLLC (57) ABSTRACT

The invention relates to a fluid channel for a heat exchanger, comprising a metal sheet, wherein the metal sheet has at least one core region of an aluminum base alloy and at least one structure arranged inside the fluid channel, wherein the structure lies against a surface of the metal sheet and can be soldered to the metal sheet in a flux-free manner by way of a first soldering location in a soldering operation, and wherein a soldering region of the metal sheet and a counterpart lie against one another and can be soldered to one another in the same soldering operation as a second solder-
(Continued)

ing location while wetting with flux, wherein an open path between the two soldering locations exists before the soldering operation.

15 Claims, 6 Drawing Sheets

(51) Int. Cl.
*F28F 1/14* (2006.01)
*F28F 21/08* (2006.01)
*B21C 37/14* (2006.01)
*B21C 37/15* (2006.01)
*B21C 37/22* (2006.01)
*B23K 1/00* (2006.01)
*B23K 35/28* (2006.01)
*F28D 1/03* (2006.01)
*B23K 101/14* (2006.01)

(52) U.S. Cl.
CPC .......... *B21C 37/225* (2013.01); *B23K 1/0012* (2013.01); *B23K 35/286* (2013.01); *F28D 1/0391* (2013.01); *F28F 21/084* (2013.01); *B23K 2101/14* (2018.08); *F28F 2275/06* (2013.01)

(58) Field of Classification Search
USPC ......................................... 165/177, 181, 183
See application file for complete search history.

(56) References Cited

U.S. PATENT DOCUMENTS

| | | | |
|---|---|---|---|
| 5,441,106 A * | 8/1995 | Yukitake | 165/183 |
| 5,762,132 A * | 6/1998 | Evans et al. | 165/133 |
| 5,839,646 A | 11/1998 | Duda et al. | |
| 5,956,846 A * | 9/1999 | Ross et al. | 29/890.043 |
| 5,996,633 A * | 12/1999 | Kato | 138/38 |
| 6,209,202 B1 | 4/2001 | Rhodes et al. | |
| 6,594,897 B2 * | 7/2003 | Kim | B23P 15/26 165/177 |
| 2003/0001000 A1 | 1/2003 | Shabtay | |
| 2004/0182559 A1 * | 9/2004 | Kent | F28D 1/0391 165/183 |
| 2006/0081682 A1 | 4/2006 | Doko et al. | |
| 2006/0219393 A1 * | 10/2006 | Igami | 165/133 |
| 2006/0254680 A1 * | 11/2006 | Rottwinkel et al. | 148/552 |
| 2007/0034366 A1 * | 2/2007 | Igami | F28D 1/0391 165/177 |
| 2007/0286763 A1 * | 12/2007 | Sicking | C22C 21/00 420/532 |
| 2009/0014164 A1 * | 1/2009 | Zobel et al. | 165/177 |
| 2009/0314475 A1 * | 12/2009 | Jeon et al. | 165/109.1 |
| 2010/0012308 A1 * | 1/2010 | Scheidegger | F28F 1/126 165/182 |

FOREIGN PATENT DOCUMENTS

| | | |
|---|---|---|
| DE | 37 25 602 A1 | 2/1989 |
| DE | 697 03 638 T2 | 5/2001 |
| EP | 0 302 232 B1 | 4/1991 |
| EP | 0 632 245 A1 | 1/1995 |
| EP | 632245 A1 * | 1/1995 |
| EP | 1 074 807 A2 | 2/2001 |
| EP | 0 781 623 B1 | 4/2001 |
| EP | 1 287 941 A1 | 3/2003 |
| EP | 1 489 372 A1 | 12/2004 |
| EP | 1 637 267 A1 | 3/2006 |
| EP | 1637267 A1 * | 3/2006 |
| GB | 2 303 089 A | 2/1997 |
| GB | 2 367 518 A | 4/2002 |
| JP | 10-298733 A | 11/1998 |
| JP | 11-315337 A | 11/1999 |
| JP | 2002-71286 A | 3/2002 |
| JP | 2002-130969 A | 5/2002 |
| JP | 2002-327994 A | 11/2002 |
| JP | 2006-317027 A | 11/2006 |
| JP | 2008-100283 A | 5/2008 |
| JP | 2008-114255 A | 5/2008 |
| JP | 2009-524000 A | 6/2009 |
| KR | 10-2002-0039962 A | 5/2002 |
| WO | WO 99/02935 A1 | 1/1999 |

OTHER PUBLICATIONS

International Search Report, PCT/EP2011/061839, dated Nov. 7, 2011, 3 pgs.
German Search Report, DE 10 2010 031 468.4, dated Nov. 22, 2010, 4 pgs.
Chinese Office Action and English translation thereof, Appl. No. 201180034198.X, 16 pgs.

* cited by examiner

SOLDERABLE FLUID CHANNEL FOR A HEAT EXCHANGER OF ALUMINUM

CROSS-REFERENCE TO RELATED PATENT APPLICATIONS

This application is a National Stage of International Application No. PCT/EP2011/061839, filed Jul. 12, 2011, which is based upon and claims the benefit of priority from prior German Patent Application No. 10 2010 031 468.4, filed Jul. 16, 2010, the entire contents of all of which are incorporated herein by reference in their entirety.

The present invention relates to a fluid channel for a heat exchanger according to the preamble of claim 1.

In the construction of heat exchangers, in particular heat exchangers for motor vehicles, the demands made in respect of the smallest possible residues of fluxes from a soldering operation are becoming ever higher. More recent findings suggest that circulating engine coolant, for example, can be damaged if the concentrations of flux constituents in the coolant become too high.

EP 0 781 623 B1 describes a process for producing an aluminum heat exchanger, in which welded flat tubes are used. In this case, the coolant-conducting interior of the flat tubes is soldered without flux, wherein beads which are formed in are joined to an opposing tube wall to form supporting walls or else inner parts inserted into the tube are soldered without flux. The outer wall of the flat tubes is coated in a conventional way with flux, which cannot pass into the interior of the tube on account of the welding of the tube wall which takes place before assembly.

It is an object of the invention to specify a fluid channel for a heat exchanger which subjects a fluid-conducting space to the smallest possible flux loading.

For a fluid channel mentioned in the introduction, this object is achieved according to the invention by the characterizing features of claim 1. Owing to the path which is open between the solder joints before the soldering operation, the fluid channel can be designed with considerably greater flexibility compared to the prior art.

Furthermore, it is advantageously possible, for example for the production of flat tubes, to dispense with a weld seam provided before the soldering operation. Owing to the soldering of the soldering region and counterpart by means of flux, at best a small amount of flux passes into the interior of the fluid channel and thus into later contact with the conducted fluid. At the same time, the flux-free soldering of the structure arranged in the interior of the fluid channel allows for a desired construction of the fluid channel, e.g. with mechanical reinforcements, partition walls and/or turbulence-generating means.

Within the context of the invention, a fluid channel is to be understood as meaning any fluid-conducting structure based on aluminum, in particular folded flat tubes or fluid-conducting chambers in heat exchangers of a stacked plate design. The soldering of the soldering region of the metal sheet, which takes place by means of flux, has the particularly expedient effect of closing off the fluid channel in a fluid-tight manner, where the favorable and procedurally reliable properties of soldering with flux are particularly advantageous. The counterpart may be, for example, a further part of the fluid channel, for example a flat tube half in the case of multi-part flat tubes. It may also be another portion of the metal sheet, for example in the case of flat tubes which are folded in a single piece and have only one closing fold.

Within the context of the invention, a flux means any additive suitable for the brazing of aluminum. The following are used inter alia as flux: potassium aluminum fluorides (trade name Nocolok) and mixtures of cesium fluoride and/or lithium fluoride and/or zinc fluoride with potassium aluminum fluorides. Furthermore, use is made of potassium silicon fluorides and silicon powder, also as mixtures with the fluxes mentioned above. The use of fluxes sold under the trade name NOCOLOK has preferably become prevalent as the technology primarily used for the tightly sealed soldering of folds in the case of aluminum folded tubes for heat exchangers. The flux is applied as a powder, suspension, paste or the like, melts shortly before the solder, cleans the surfaces which are to be soldered and produces a metallically bright, oxide-free aluminum surface, which the liquid solder requires in order to be able to wet and bind.

In a particularly preferred embodiment of the invention, a capillary gap is formed between the soldering region and the counterpart at least during the soldering operation, wherein the capillary gap comprises a contact surface and a flushing channel. It is preferable, but not necessary, for the counterpart additionally to be a further soldering region of the metal sheet; by way of example, the soldering regions may be various portions of the same surface. This makes it possible overall to effect transportation of molten flux through the capillary gap and collection and/or discharge through the flushing channel over the course of the soldering operation. Tests have shown that such an arrangement is particularly well suited to making soldering with flux possible even in the presence of magnesium-containing aluminum alloys. In general, it is assumed according to the prior art that, in the case of magnesium-containing alloys, a proportion of magnesium diffuses out over the course of heating and, together with the flux, forms crystals which are harmful to the soldering operation, e.g. magnesium fluoride crystals. One possible, not necessarily correct explanation of the surprisingly good function of the preferred embodiment would be the flushing away of such crystals by the flowing flux, that is out of the capillary gap into the flushing channel.

Within the context of the present invention, a magnesium-free alloy is understood as meaning a magnesium content of less than 0.03% in the aluminum alloy. Here, all percentages indicated in relation to alloys are to be understood as % by weight.

It is generally advantageous that the core region of the metal sheet has a magnesium content of at least approximately 0.03%, particularly preferably between approximately 0.1% and approximately 0.3%. It is generally preferable that the magnesium content of the core region is not more than approximately 1.0%. The mechanical properties can thereby be improved. If the core region has no further coatings, e.g. protective platings, this magnesium content additionally improves or makes possible the flux-free soldering of the structure to the surface of the metal sheet.

In a preferred embodiment, the metal sheet has at least one unilateral solder plating, wherein the solder plating has, with particular preference but not necessarily, a magnesium content of less than approximately 2.5%. This upper limit of the magnesium content is adequate for flux-free soldering and affords a sufficient limit in respect of a negative effect on the neighboring flux-containing soldering by magnesium evaporating out. In a particularly optimized embodiment, the magnesium content of the solder plating is between approximately 0.03% and approximately 0.8%.

In an alternative or supplementary embodiment, the structure is in the form of a turbulator made of an aluminum alloy which is inserted into the fluid channel. The turbulator may have, for example, any known form of inner fin, for instance a corrugated fin, a web fin or the like. The flux-free soldering thereof is particularly expedient, since the occurrence of isolated disruptions to the soldering, for example given unfavorable deviations in the process parameters, can be better tolerated than, for instance, in the case of fluid-tight soldering of the soldering region to the counterpart. In a particularly advantageous development, the material of the turbulator does not contain any magnesium (or the magnesium content is <0.03%), wherein the metal sheet contains magnesium for soldering to the turbulator without flux. This takes into consideration the fact that turbulators usually have a large surface, through which, under unfavorable circumstances, even in the case of small magnesium contents, so much magnesium could evaporate out overall that the neighboring flux-containing soldering might be disrupted. In an alternative embodiment thereto, it is provided that the material of the turbulator contains no more than 0.7% magnesium and/or contains a solder plating having a magnesium content of between 0.03% and 0.8%. Tests have shown that even such magnesium concentrations in the core material and/or in a possible solder plating of the turbulator are regularly harmless.

In a generally preferred embodiment of the invention, the fluid channel is in the form of a flat tube having a fold which runs in the longitudinal direction of the tube, wherein the fold is in the form of a soldering region of the metal sheet. Within the context of the invention, a fold which runs in the longitudinal direction of the tube is understood as meaning any interface which can be soldered areally. By way of example, the fold can run on a broad side of the flat tube or on a narrow side. Particularly in the latter case, the fold may be shaped as a clip closure of the tube. If the fold runs on a broad side and the flat tube is provided with webs, it is expedient to provide the solder joints of the fold and of the adjacent webs on opposing sides of the flat tube.

It is very generally preferable for the fold of a flat tube according to the invention which has been soldered with wetting by flux to be at a minimum distance of 2 mm, particularly preferably of 4 mm, from the closest flux-free solder joint, in order to ensure a sufficient safety distance.

In a possible configuration of the invention, the structure can be in the form of at least one web which is shaped from the metal sheet and lies against the surface of the metal sheet. It is preferable, but not necessary, that a multi-chamber flat tube can be formed by the web. It is self-evident that both single-chamber and multi-chamber flat tubes with or without inserted turbulators can be provided.

In a preferred detail design of the invention, it is provided that the soldering region of the metal sheet has a fold portion which can be soldered areally with wetting by flux and also an adjoining edgefold bent through more than 90°. The edgefold provides an edge with defined rounding for abutment against a surface and/or for forming, for example, a flushing channel which directly adjoins the fold portion. Depending on the materials used, it may be provided with particular preference that the following applies for a length L of the edgefold and a thickness D of the metal sheet:

$L > 2*D;$ wherein, particularly for the case of an edgefold bent through 180°, the following further applies:

$L < (B - 2.5*D)$, with a width $B$ of the flat tube.

Overall, this ensures that a cut edge on the end face of the metal sheet or of the edgefold is positioned at a sufficient minimum distance from a solder joint wetted with flux or a flux-conducting region (e.g. a flushing channel). It is thereby feasible that, for example, core material exposed at the cut edge of the metal sheet, which possibly has a high magnesium content, does not disrupt the soldering process by magnesium evaporating out and reacting with the flux.

It is generally advantageous that the flux is applied areally and in excess to at least part of an opposing surface of the metal sheet before the soldering operation. Particularly if the edge of the metal sheet or the counterpart is suitably shaped, the flux does not flow or flows only to a small extent into the inner region of the fluid channel, in which flux-free soldering takes place. It is particularly preferable that the flux is applied by means of a process from the group consisting of a thermal spraying process and paintflux process. In thermal spraying processes, the flux is introduced into a high-energy, hot gas stream with air-stream powder conveying. The flux melts in part or completely and is thus applied to the surface. Known processes are, inter alia, plasma spraying processes, laser-induced spraying processes and hot-gas spraying processes. A paintflux process is understood as meaning in particular, but not exclusively, a process according to the document EP 1 287 941 A1.

The flux loading, irrespective of the application process, is advantageously 3 to 40 g/m², preferably 5-20 g/m² and particularly preferably 7-14 g/m².

Further advantages and features of the invention become apparent from the exemplary embodiments described hereinbelow and also from the dependent claims.

A plurality of preferred exemplary embodiments of the invention will be described and explained in further detail with reference to the accompanying drawings hereinbelow.

Figure 1:
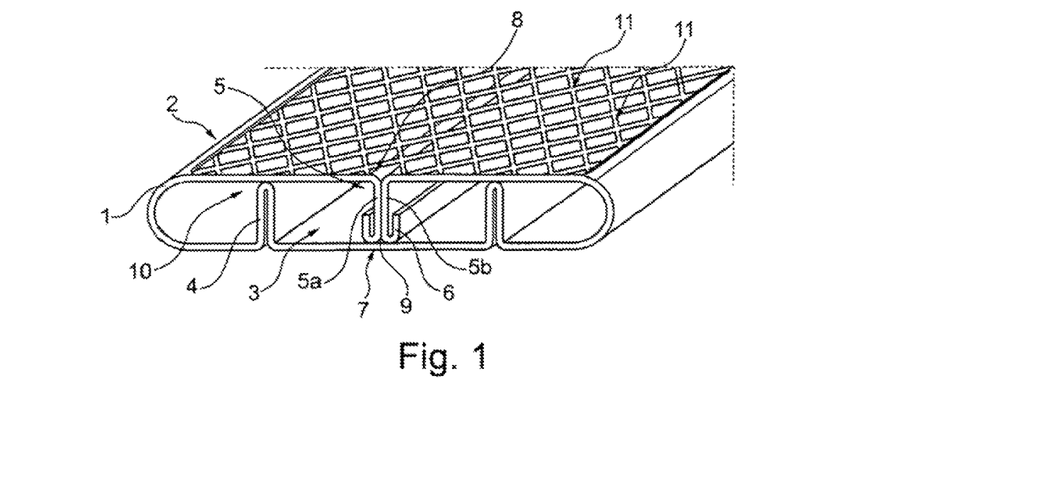
FIG. 1 shows a first embodiment of a fluid channel according to the invention.

The fluid channel shown in FIG. 1 is in the form of a flat tube shaped from a single metal sheet 1. The metal sheet 1 consists of an aluminum alloy, which in the present case has a magnesium content. In the present case, although not generally necessary, it is possible for a solder plating to be applied to a core region of the metal sheet at least on the outer surface 2. For the present exemplary embodiment, and all further exemplary embodiments, the following alloys are preferred for the core region, which corresponds to the entire metal sheet if there are no solder platings, and for the solder platings (all figures in % by weight):

Core Region/Base Material of the Metal Sheet:

|    | Minimum   | Preferred | Maximum   |
|----|-----------|-----------|-----------|
| Al | Remainder | Remainder | Remainder |
| Si | 0         | —         | 1.2       |
| Fe | 0         | 0-0.4     | 0.7       |
| Cu | 0.1       | 0.3-0.8   | 1.2       |
| Mn | 0         | —         | 2.0       |
| Mg | 0.03      | 0.1-0.3   | 1.0       |
| Cr | 0         | 0-0.2     | 0.5       |
| Zn | 0         | —         | 2.5       |
| Ti | 0         | 0-0.10    | 0.3       |
| Sn | 0         | —         | 0.05      |
| Zr | 0         | —         | 0.2       |
| Bi | 0         | —         | 0.05      |
| Sr | 0         | —         | 0.05      |

Solder Plating:

|    | Minimum   | Preferred | Maximum   |
|----|-----------|-----------|-----------|
| Al | Remainder | Remainder | Remainder |
| Si | 5 to 6    | 7-11      | 20        |
| Fe | 0         | 0-0.2     | 0.8       |
| Cu | 0         | 0-0.3     | 1         |
| Mn | 0         | —         | 0.15      |
| Mg | 0         | 0.03-0.8  | 2.5       |
| Cr | 0         | —         | 0.05      |
| Zn | 0         | 0-2.0     | 4         |
| Ti | 0         | 0-0.10    | 0.2       |
| Sn | 0         | —         | 0.05      |
| Zr | 0         | —         | 0.05      |
| Bi | 0         | 0-0.20    | 0.5       |
| Sr | 0         | 0-0.05    | 0.2       |

In the present case, the flat tube is in the form of a multi-chamber flat tube having two folded webs 4 and a fold 5 for closing the tube along a longitudinal direction.

In the present case, the fold 5 is arranged on a broad side of the flat tube. It comprises a first fold portion 5a and a second fold portion 5b, which are each formed by bending opposing edge regions of the metal sheet 1 through 90°. A respective edgefold 6 adjoins the fold portions 5a, 5b through 180°. In the region of the edgefolds 6, the fold portions 5a, 5b lie against an abutment region 7 of the inner sheet metal surface 3 or inner side of the flat tube. Alongside the abutment region 7, each of the fold portions 5a, 5b forms a soldering region or a counterpart within the context of the invention.

The fold portions 5a, 5b lying against one another by way of a contact surface between them form a capillary gap 8. A flushing channel 9 is shaped at the fold between the soldering region 7 and the edgefolds 6, into which flushing channel the capillary gap 8 issues and which has a greater diameter than the capillary gap 8.

The webs 4 have a height which corresponds to the inside diameter of the flat tube, and lie against the surface 3 on the inside of the metal sheet 1 in an abutment region 10. The abutment region 10 is located on that side of the flat tube which lies opposite the soldering region 7, and therefore there is a particularly large distance between the abutment region 10 and the abutment region 7.

The webs 4 form a structure arranged in the interior of the fluid channel within the context of the invention, which lies against the inner surface 3 of the metal sheet in the abutment region 10 in order to form a first, flux-free solder joint there.

The fold 5 forms, with the fold portions 5a, 6a thereof and also the abutment region 7, a second solder joint, which is wetted with flux in a soldering operation. To this end, in the first exemplary embodiment, the entire outer broad side of the flat tube is provided with flux 11 on the side of the fold 5. The flux 11 is NOCOLOK (trade name), which has been applied by means of a paintflux process.

The fold which is open before the soldering creates an open path between the two solder joints. In particular, it is possible in geometrical terms for molten flux to flow from the second solder joint directly to the first solder joint, but in actual fact this is prevented according to the invention.

A fin or other structure of a stack of components which overall form a heat exchanger may be positioned on the outer side (not shown). The thus preassembled structure is placed in a soldering furnace and heated. In this case, both the first, flux-free solder joint and the second solder joint wetted with flux are soldered at the same time in the same soldering operation.

At an appropriate temperature, firstly the flux applied on the outside liquefies and flows into the capillary gap 8. In the present example, the flux is present in excess. After it has flowed through the gap 8 driven by a capillary action, the flux collects in the flushing channel 9. Depending on the detail design, it may also be provided in addition, but not necessarily, that the flux is discharged from the flushing channel by way of formations at the end of the flat tube (not shown).

On account of the flushing channel with a separating action, in the present case there is no wetting of the flux-free, first solder joint 4, 10. There, on account of the materials selected, flux-free soldering is effected, such that the web 4 is soldered as the structure to the opposing surface of the metal sheet. As a result of this, mechanical consolidation of the fluid channel is achieved and a plurality of separated chambers are formed.

Figure 2:
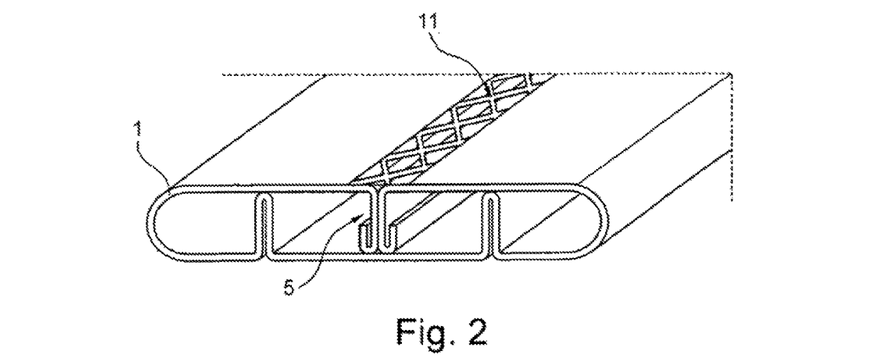
FIG. 2 shows a second embodiment of a fluid channel according to the invention.
Figure 3:
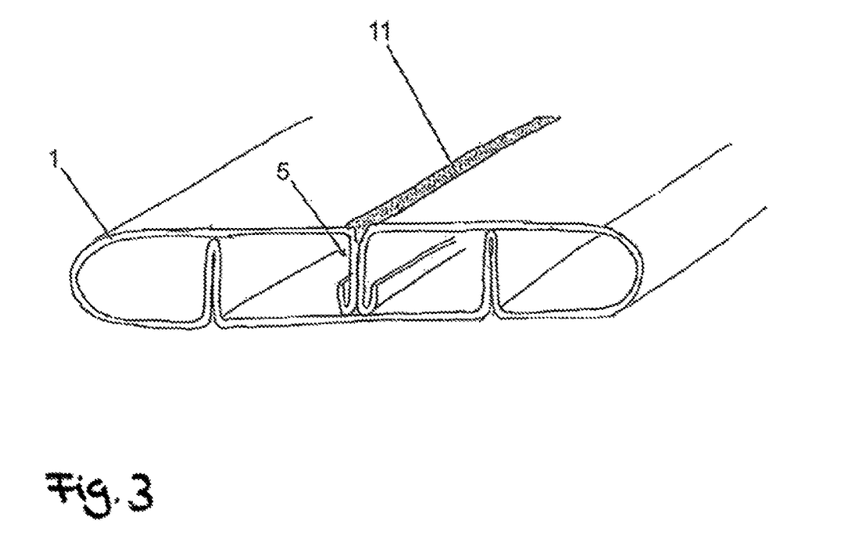
FIG. 3 shows a third embodiment of a fluid channel according to the invention.
Figure 4:
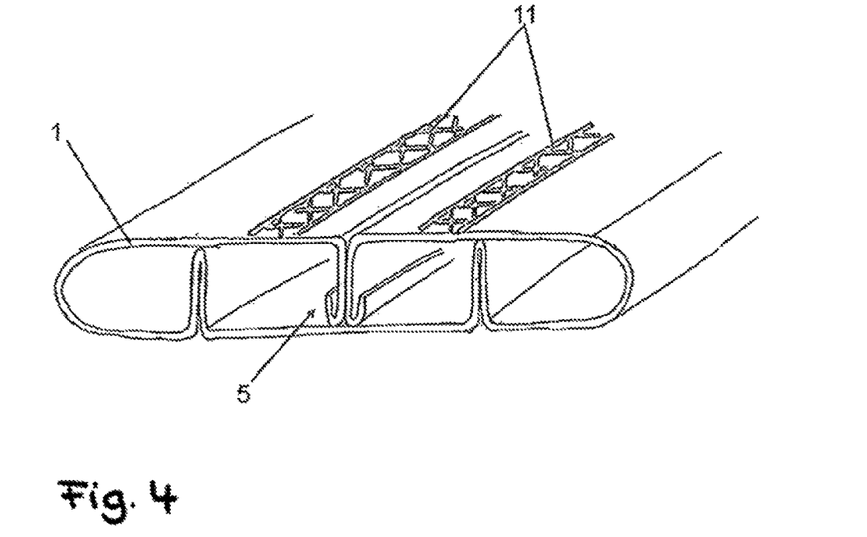
FIG. 4 shows a fourth embodiment of a fluid channel according to the invention.

The exemplary embodiments shown in FIG. 2 to FIG. 4 differ from the first example only in that the application of flux to the outside is not effected over the whole surface area.

In the example shown in FIG. 2, only selective application is effected only in parts in a wide strip over the region of the fold 5.

In the example shown in FIG. 3, the flux is applied only as a streak directly in the fold capillary, the edge of the capillary being filled in.

In the example shown in FIG. 4, the flux is applied in two narrow strips to each side of the fold 5. After the readily wetting flux has liquefied, it also flows into the capillary gap.

In each of the examples shown in FIG. 1 to FIG. 4, the flux is applied in excess.

Figure 5:
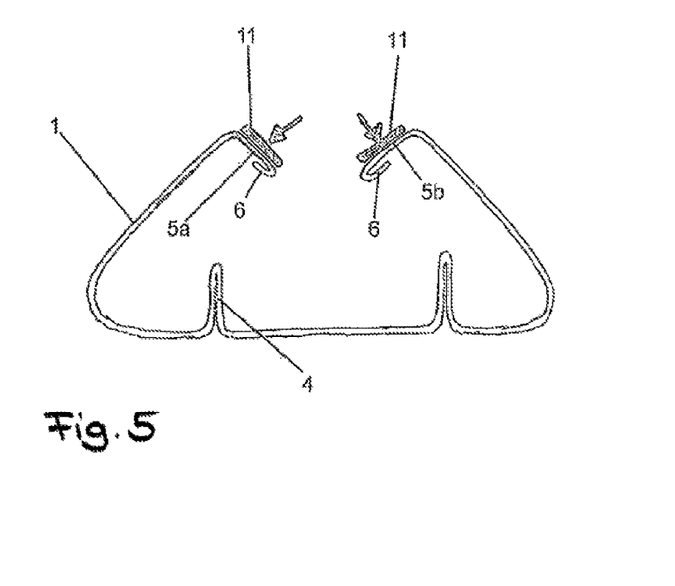
FIG. 5 shows a fifth embodiment of a fluid channel according to the invention.

The example shown in FIG. 5 shows an application directly to the fold portions 5a, 5b, the flux being applied during the folding of the tube or before the tube is completely folded together.

Figure 6:
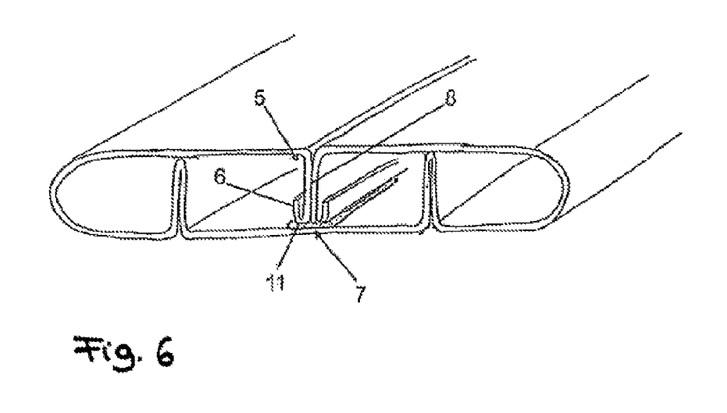
FIG. 6 shows a fifth embodiment of a fluid channel according to the invention.

FIG. 6 shows an example in which the flux has been applied to the soldering region 7 against which the edgefolds 6 lie before the tube is folded together. In this example, at least some of the applied solder is not reliably received by the flushing channel, and can, in principle, flow to the side to the webs to be soldered without flux. To avoid such undesirable wetting, in the example shown in FIG. 6 the amount of flux applied is not excessive, but rather defined. Such defined dimensioning also lends itself as a possible improvement for the example shown in FIG. 5.

Figure 7:
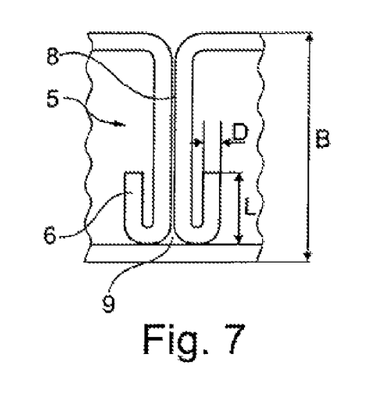
FIG. 7 shows a detailed section of a fold of one of the embodiments shown in FIG. 1 to FIG. 6.
Figure 8:
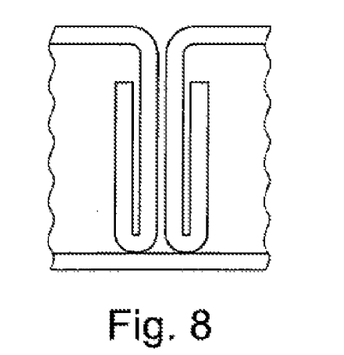
FIG. 8 shows a first modification of the fold shown in FIG. 7.
Figure 9:
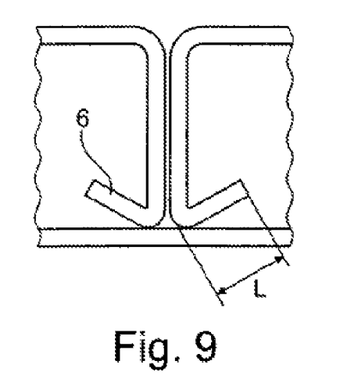
FIG. 9 shows a second modification of the fold shown in FIG. 7.

FIG. 7 to FIG. 9 show various variants of the edgefolds 6, which can be combined with any of the above examples. In particular, if a core region of the metal sheet contains a large amount of magnesium and is plated with solder which likewise contains magnesium, the open end face of the edge of the metal sheet can release a large amount of magnesium upon heating. The emerging magnesium could lead to an intolerable consumption of flux, with magnesium fluoride being formed in the soldered joint.

The following relationship therefore preferably applies for a metal sheet thickness D, a length of the edgefold L and a tube width B:

$$L > 2*D.$$

The edgefold here can be bent through any angle of significantly greater than 90° (see for instance FIG. 9), in particular through 180° (see FIG. 7, FIG. 8).

If the edgefold amounts to 180°, the following relationship should wherever possible also be observed, in order to prevent the end edge and the opposing side of the metal sheet from being too close (see FIG. 8):

$$L < B - 2.5*D.$$

In general, it is to be ensured expediently that the end edges of the edgefolds 6 also do not make contact with the walls of the fold portions 5a, 6a. It is preferable here to observe a safety distance of at least approximately the metal sheet thickness D. It is advantageous if the distance between a region provided with flux (coated with flux) and a region not provided with flux (not coated with flux), which are each also soldered, is approximately 2 to 4 mm, or 3 to 5.

It is also advantageous if the web 4 or the webs 4 lie against the opposing inner side of the tube wall.

Overall, this particularly effectively prevents magnesium from evaporating or diffusing towards undesirable regions or flux from flowing into the region of the end edges of the edgefolds 6.

Figure 10:
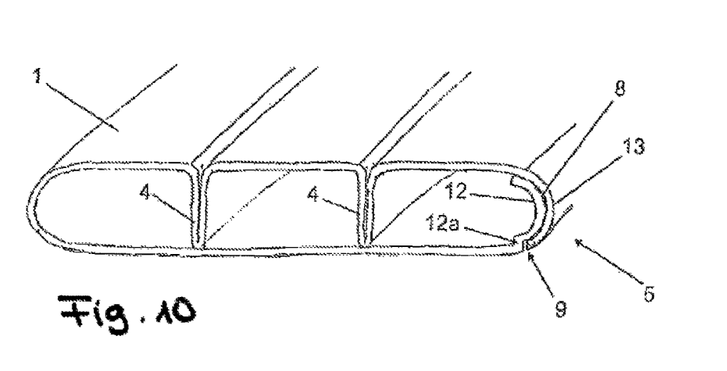
FIG. 10 shows a further embodiment of a fluid channel according to the invention in the manner of a clip tube.

In the example shown in FIG. 10, the fold is not provided on the broad side of the flat tube, as in the preceding examples, but rather on the narrow side. Two opposing edges of the metal sheet 1 have a respectively part-circular bend 12, 13, such that they engage into one another in a form-fitting manner in the closed state. In this way, the flat tube is formed as a clip tube. The outer face of the bend 12 lying on the inside and the inner face of the bend 13 lying on the outside lie against one another, such that a capillary gap 8 is formed therebetween. A flushing channel with an action analogous to that in the preceding examples is formed by a void between the end of the bend 13 lying on the outside and a graduation 12a of the bend 12 lying on the inside.

Flux can be applied in a manner analogous to the preceding examples to the outer face of the tube or in a targeted manner to one or both of the faces of the bends 12, 13 which are soldered to one another.

Analogously to the preceding examples, the flat tube has at least two webs 4 soldered without flux in the interior thereof, such that it is constructed in the manner of a multi-chamber flat tube.

Figure 11:
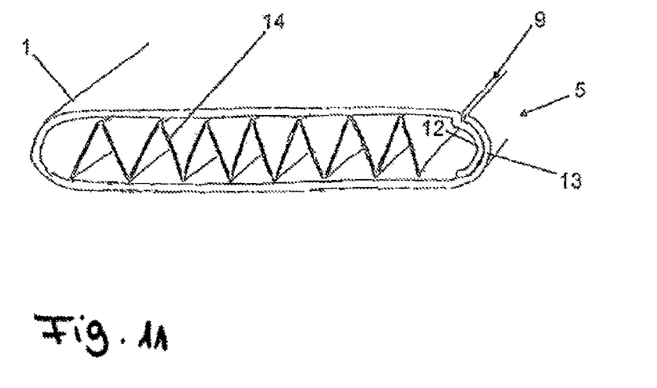
FIG. 11 shows a modification of the fluid channel shown in FIG. 10 with an inserted turbulator.

FIG. 11 shows a further example, in which the fold is formed as in FIG. 10. In contrast to FIG. 10, a structure in the form of a turbulator 14 is inserted into the tube and is soldered without flux to the surface on the inside of the metal sheet 1. In the present case, the turbulator 14 is formed as a corrugated fin. It is self-evident that, depending on requirements, turbulators can also be inserted into multi-chamber flat tubes as in FIG. 10.

The following alloys are preferred for a turbulator:

| | Minimum | Preferred | Maximum |
|---|---|---|---|
| Al | Remainder | Remainder | Remainder |
| Si | 0 | 0.2-0.6 | 1.2 |
| Fe | 0 | 0-0.4 | 0.7 |
| Cu | 0 | — | 0.7 |
| Mn | 0 | — | 2.0 |
| Mg | 0 | 0-0.7 | 3.0 |
| Cr | 0 | 0-0.2 | 0.5 |
| Zn | 0 | — | 3.5 |
| Ti | 0 | — | 0.3 |
| Sn | 0 | — | 0.2 |
| Zr | 0 | — | 0.2 |
| Bi | 0 | — | 0.05 |
| Sr | 0 | — | 0.05 |

In a very preferred configuration, the turbulator is free from magnesium (<0.03% magnesium content). This avoids evaporation of magnesium which is undesirably high on account of the often large surface of turbulators. In such a configuration, the magnesium desired for the flux-free soldering is provided entirely by the metal sheet material and/or a solder plating of the metal sheet. In principle, the turbulator may also have a solder plating.

The following generally holds true: the combination of flux-free web soldering on the inner side of the tube or flux-free soldering of the inner turbulator to the inner side of the tube and flux-containing fold soldering requires suitable materials for the base material of the tube and solder plating, or, in the case of an inner turbulator, for the base material of the turbulator and turbulator solder plating.

The following variants of plated and unplated joining partners are preferred:
 tube metal sheet solder-plated on the inside and outside, only webs and fold, no turbulator;
 tube metal sheet solder-plated on the inside and outside, only fold, no webs, bare turbulator;
 tube metal sheet solder-plated only on the outside and turbulator solder-plated on both sides.

Figure 12:
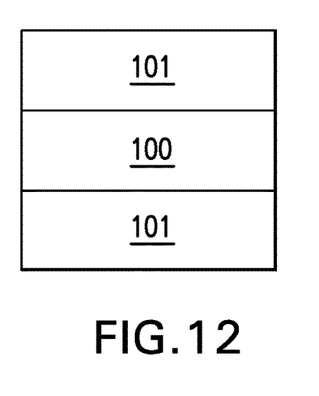
FIG. 12 shows a block diagram depicting one embodiment of the application. The block diagram shows connection only and is not intended to show structural features such as relative size, orientation, and spacing.
Figure 13:
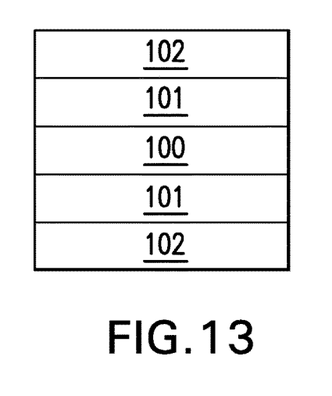
FIG. 13 shows a block diagram depicting one embodiment of the application. The block diagram shows connection only and is not intended to show structural features such as relative size, orientation, and spacing.

The following material concepts for the flux-free inner soldering are preferred:
 Material concepts in a normal 3-layer structure (100, 101) (consisting of solder/base material of the tube/solder and/or solder/turbulator material/solder), which contain certain minimum proportions of magnesium. In addition, the use of magnesium-containing alloys for the tube and the inserted turbulator constitutes a possibility to improve the strength properties of the aluminum materials used.
 Multi-layer concepts with a 4-layer or 5-layer structure (100, 101, 102) (consisting of solder/tube material/solder/top layer or top layer/solder/tube material/solder/top layer and analogously for the turbulator), which, on account of the mechanisms which occur in flux-free soldering, have to contain only small proportions of magnesium only in the solder (<0.10%). The base material of the tube may also contain small proportions of magnesium, but may also be selected to be completely free from Mg (<0.03%).

It is self-evident that the individual features of the various exemplary embodiments can be combined with one another, depending on requirements.

The invention claimed is:

1. A fluid channel for a heat exchanger, comprising:
 a metal sheet forming a tube having a first surface and a second surface, wherein the metal sheet is bent such that the first surface bounds the fluid channel and the second surface in part faces an environment, wherein the metal sheet comprises at least one core region comprising an aluminum base alloy, wherein the tube has a first flat side and a second flat side;

at least one first structure formed by a 180° bend in the metal sheet projecting from the first flat side toward the second flat side and arranged inside the fluid channel dividing the fluid channel into multiple chambers, wherein a portion of the at least one first structure lies against a flat portion of the first surface of the metal sheet having no projection on the second flat side and is joined to the first surface of the metal sheet by a first solder joint that does not contain a flux material;

a second structure formed by a joining of a first edgefold and a second edgefold, wherein the second structure comprises a soldering region of the second surface of the metal sheet on the first edgefold and a counterpart region of the second surface of the metal sheet on the second edgefold, wherein the soldering region and the counterpart region lie against one another and are joined by a second solder joint containing a flux material, wherein the counterpart region comprises an at least one unilateral solder plating having the following composition:
7-11% Si,
0-0.8% Fe,
0-1% Cu,
0.03-2.5% Mg,
0-4% Zn,
0-0.2% Ti,
0-0.5% Bi, and
0-0.2% Sr,
wherein a remainder of the composition is Al; and a capillary gap formed between the soldering region and the counterpart region, wherein the capillary gap comprises a contact surface, wherein at one end the capillary gap is connected to a flushing channel and at another end the capillary gap is connected to the environment, wherein the flushing channel is approximately of triangular shape having two side walls formed the second surface of the metal sheet which converge toward the capillary gap and one side wall formed by the first surface of the metal sheet, wherein the flushing channel permits discharging the flux material from the second solder joint.

2. The fluid channel as claimed in claim 1,
wherein a core region of the metal sheet has a magnesium content of at least approximately 0.03%.

3. The fluid channel as claimed in claim 1, wherein the magnesium content of the at least one unilateral solder plating is between 0.03% and 0.8%.

4. The fluid channel as claimed in claim 1,
further comprising turbulators made of an aluminum alloy where each turbulator is inserted into a chamber of the fluid channel.

5. The fluid channel as claimed in claim 4,
wherein the aluminum alloy of the turbulator contains no more than 0.7% magnesium or wherein the at least one unilateral solder plating has a magnesium content between 0.03% and 0.8%,
wherein the metal sheet contains magnesium for soldering to the turbulator without flux material.

6. The fluid channel as claimed in claim 4, wherein the aluminum alloy of the turbulator contains no more than 0.7% magnesium and/or contains an at least one unilateral solder plating having a magnesium content of between 0.03% and 0.8%.

7. The fluid channel as claimed in claim 1, wherein the fluid channel is in the form of a flat tube having a fold which runs in a longitudinal direction of the tube, wherein the fold is in the form of a soldering region of the metal sheet.

8. The fluid channel as claimed in claim 7,
wherein the at least one first structure is in the form of at least one web which is shaped from the metal sheet and lies against the first surface of the metal sheet, forming and forms a multi-chamber flat tube.

9. The fluid channel as claimed in claim 7, wherein the soldering region of the metal sheet has a fold portion which is soldered areally with wetting by flux material and an adjoining edgefold bent through more than 90°.

10. The fluid channel as claimed in claim 9, wherein the following equation applies for a length L of the adjoining edgefold and a thickness D of the metal sheet:

$$L>2*D;$$

wherein, for the case of an edgefold bent through 180°, the following equation further applies:

$$L<(B-2.5*D), \text{ with a width } B \text{ of the flat tube.}$$

11. The fluid channel for a heat exchanger as claimed in claim 1,
wherein the flushing channel is bounded by the counterpart region and the soldering region,
wherein a width of the flushing channel is greater than that of the capillary gap and is sufficient to permit discharging of flux material.

12. The fluid channel for a heat exchanger according to claim 1,
wherein the metal sheet has a core region having the following composition:
0-0.7% Fe,
0.3-1.2% Cu,
0-0.5% Cr,
0-0.3% Ti,
0-1.2% Si,
0-2.0% Mn,
0.1-1.0% Mg,
0-0.2% Zr,
wherein a remainder of the composition is Al.

13. The fluid channel for a heat exchanger according to claim 12, wherein the metal sheet comprises three layers having the following structure: solder plating/core region/solder plating.

14. The fluid channel for a heat exchanger according to claim 12, wherein the metal sheet comprises five layers having the following structure: top layer/solder plating/core region/solder plating/top layer.

15. A fluid channel for a heat exchanger, comprising:
a metal sheet having a first surface and a second surface, wherein the metal sheet is bent such that the first surface bounds the fluid channel and the second surface in part faces an environment, wherein the metal sheet comprises at least one core region comprising an aluminum base alloy;

at least one structure formed by a 180° bend in the metal sheet and arranged inside the fluid channel dividing the fluid channel into multiple chambers, wherein a portion of the at least one structure lies against a flat portion of the first surface of the metal sheet and is joined to the first surface of the metal sheet by a first solder joint that does not contain a flux material, wherein a soldering region of the second surface of the metal sheet and a counterpart region of the second surface of the metal sheet lie against one another and are joined by a second solder joint containing a flux material,
wherein the counterpart region comprises an at least one unilateral solder plating having the following composition:
7-11% Si,
0-0.8% Fe,
0-1% Cu,
0.03-2.5% Mg,
0-4% Zn,
0-0.2% Ti,
0-0.5% Bi, and
0-0.2% Sr,
wherein a remainder of the composition is Al,
wherein the metal sheet has a core region having the following composition:
0-0.7% Fe,
0.3-1.2% Cu,
0-0.5% Cr,
0-0.3% Ti,
0-1.2% Si,
0-2.0% Mn,
0.1-1.0% Mg,
0-0.2% Zr,
wherein a remainder of the composition is Al,
wherein the metal sheet comprises three layers having the following structure: solder plating/core region/solder plating; and
a capillary gap formed between the soldering region and the counterpart region, wherein the capillary gap comprises a contact surface, wherein at one end the capillary gap is connected to a flushing channel and at another end the capillary gap is connected to the environment, wherein the flushing channel is approximately of triangular shape having two side walls formed the second surface of the metal sheet which converge toward the capillary gap and one side wall formed by the first surface of the metal sheet, wherein the flushing channel is bounded by the counterpart region and the soldering region, wherein the flushing channel permits discharging the flux material from the second solder joint.

* * * * *